United States Patent
Oki et al.

[11] Patent Number: 6,118,503
[45] Date of Patent: Sep. 12, 2000

[54] LIGHT GUIDE DEVICE ENHANCING A POLARIZED COMPONENT AND LIQUID CRYSTAL DISPLAY DEVICE

[75] Inventors: Yoji Oki; Koji Kawada; Masaru Suzuki, all of Kanagawa, Japan

[73] Assignees: Stanley Electric Co., Ltd., Tokyo, Japan; IBM, Armonk, N.Y.

[21] Appl. No.: 09/399,124

[22] Filed: Sep. 20, 1999

[30] Foreign Application Priority Data

Sep. 22, 1998 [JP] Japan .................................. 10-268704

[51] Int. Cl.[7] .................................................. G02F 1/1335
[52] U.S. Cl. .................................. 349/65; 349/66; 362/31
[58] Field of Search ........................ 349/95, 62, 65, 349/66; 385/129; 362/31

[56] References Cited

U.S. PATENT DOCUMENTS 5,845,035   1/1998   Wimberger-Friedl ................... 385/129

FOREIGN PATENT DOCUMENTS

8-248224   9/1996   Japan ....................................... 349/65

*Primary Examiner*—James A. Dudek
*Attorney, Agent, or Firm*—Earl C. Hancock; Holland & Hart LLP

[57] ABSTRACT

A polarized component is obtained with a high conversion efficiency in a light guide which produces one of the polarized components by having it transmitted. The light from a light source is incident to a light guide which comprises a plurality of light guide layers and reflected by the end surface to an interface between the light guide layers. The polarized component transmitting through the end surface is rotated in its polarization plane by a wave length plate and reflected by a reflecting plate for reentrance to the light guide at the end surface of the light guide toward the interface. The reentering light mostly transmits through the interface because the polarization plane is rotated. A reflected light polarized component is returned to the wave length plate and the reflecting plate, and directed back to the interface again. The polarized component transmitting through the interface is similarly transmitted and reflected in the next interface. The number of interfaces can be reduced by increasing the reflection of the polarized component reflected in the interface. For this purpose, the index of refraction in the direction along the axis of the reflected polarized component is increased by making the index of refraction of the light guide layer anisotropic.

9 Claims, 5 Drawing Sheets

FIG. 1

STRUCTURE OF LIGHT GUIDE UNIT FOR POLARIZED LIGHT

DEFLECT 70% OF LIGHT TO THE FRONT BY A MATERIAL OF n=1.58

FIG. 7

DEFLECT 70% OF LIGHT TO THE FRONT BY A MATERIAL OF n=1.58

LIGHT GUIDE DEVICE ENHANCING A POLARIZED COMPONENT AND LIQUID CRYSTAL DISPLAY DEVICE

BACKGROUND OF THE INVENTION

1. Field of the Invention

The present invention relates to a light guide unit for use in a liquid crystal display device in which a polarized component of light is enhanced and a liquid crystal display device which is provided with such light guide unit. Particularly, this invention relates to a light guide unit for efficiently converting the light from a light source to a polarized light and a liquid crystal display device having means for efficiently directing the polarized light emitted from such light guide unit to a liquid crystal cell.

2. Description of the Related Art

A liquid crystal display device is conventionally observed by directing polarized light to a liquid crystal cell to cause the polarization plane to be rotated depending on the condition of the cell for passage through a polarizer plate. A light source of the polarized light is placed in the back of the liquid crystal plate and thus is called a "back light". For obtaining such polarized light wave, a non-polarized light was conventionally incident to a polarizer plate and either one of the polarized components; i.e., S component and P component, was absorbed.

Assuming that a plane defined by a light incident to a point of incidence on a surface is an incident plane, a polarized component parallel to the incident plane is called a P component while a component perpendicular to the incident plane is called an S component. Therefore, more than 50-percent of an incident light was not effectively utilized in principle and an actual measurement shows that about 58-percent of the incident light is absorbed.

Further, a light dispersing sheet having printed dots was typically used in addition to a polarization device for obtaining polarized light by absorbing a polarized component in a conventional Liquid Crystal Display (LCD) device, and this makes an additional 20-percent of the light unavailable.

Figure 1:
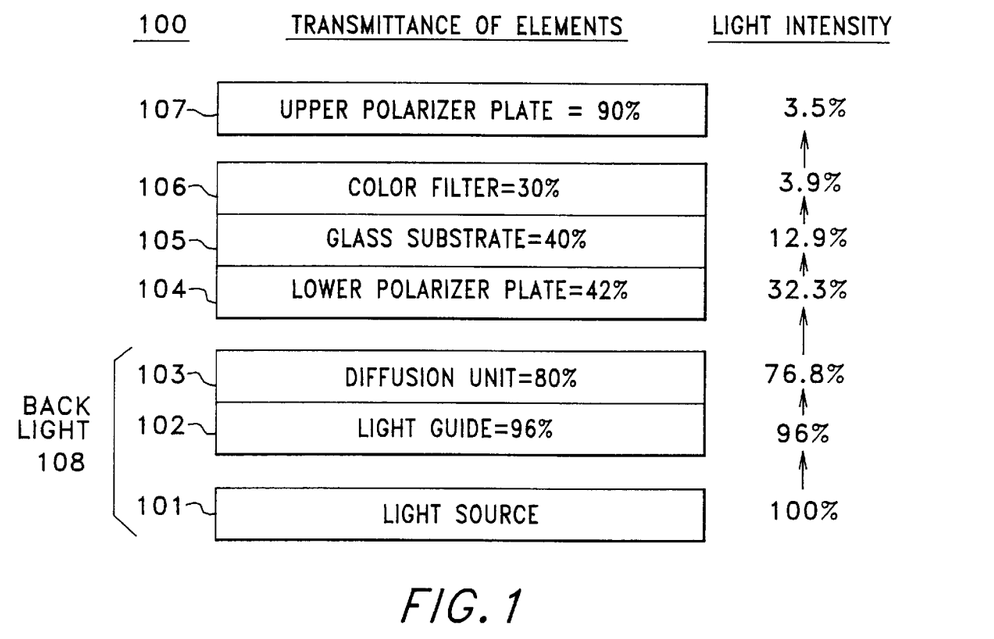
FIG. 1 is a schematic diagram showing a conventional LCD device.

In FIG. 1, a LCD module 100 of a conventional LCD device is shown. The light emanating from a light source 101 transmits through a light guide plate 102 having 96% transmittance, a dispersion sheet 103 having 80% transmittance, a lower polarizer plate 104 having 42% transmittance, a glass substrate 105 having a numerical aperture of 40%, a color filter 106 having 30% transmittance, and an upper polarizer plate 107 having 90% transmittance, resulting in an actually available light intensity which is 3.5% of the light generated in the light source 101. This greatly prevents the energy from being utilized efficiently.

A back light system of a high intensity for use in a low power consumption LCD device is especially desired because it is an important objective in a portable personal computer to assure a longer usable time with a given capacity of a battery and the power consumption of a back light 108 is a major percentage of total power consumption.

Also, the light energy absorbed in the lower polarizer plate 104, etc., is converted to heat energy which contributes to degradation of parts of the LCD device. Particularly for a liquid crystal material of STN (Super Twisted Nematic) type in which the display quality is degraded by heat, it is an important objective to reduce such heat generation. As seen from FIG. 1, 66.4% of the light energy is converted to heat energy by the light absorption in the lower polarizer plate 104 and the dispersion sheet 103 (this is 69% of heat generation by the light energy).

Figure 3A:
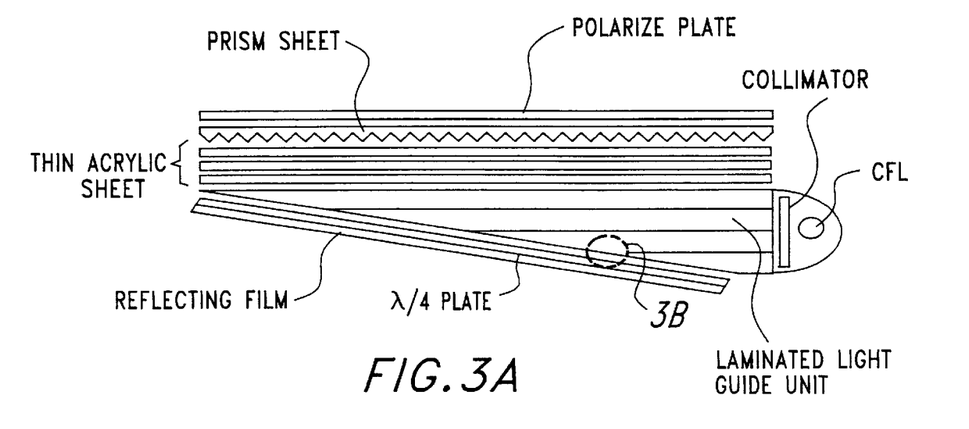
FIG. 3A is a diagram showing the structure of a conventional LCD polarizer plate unit.

In order to solve such problems, the applicant of this application filed Japanese patent application no. 9-249139 relating to a method of improving the efficiency of light utilization in obtaining a polarized light by making available for use at least a part of a polarized component which had not been utilized. The principle of this method is shown in FIG. 3.

Light from a fluorescent lump CFL which is a light source is incident to the end surface of a laminated light guide plate unit via a reflecting mirror and a collimator. It propagates through the layers of the light guide plates, and arrives at the other end surface which is cut in an angle. The incident light is partly reflected at the other end surface with the rest being transmitted therethrough. The polarization plane of the light transmitting through the end surface is rotated by a quarter wave length plate placed thereunder and reflected by a reflecting plate placed under the quarter wave length plate for reentrance to layers of the light guide plate again through the quarter wave length plate as a P component.

The P component reentering the light guide plates is incident to the interface with an adjacent light guide plate layer. The angle of incidence of the light on the interface is the Brewster angle (to be described later in detail). Therefore, all the P component and a part of the S component of the light incident to the interface transmit through the interface with the rest of the S component reflected back to the quarter wave length plate and the reflecting plate. The light reflected again by the reflecting plate is again directed to the interface after being converted to a P component by the quarter wave length plate where all the P component and a part of the S component, if any, transmit with the rest being reflected.

The light reflected here is reflected repeatedly in a similar manner and a light converted to a P component for each reflection transmits through the interface. As such, the light guide unit ultimately emits a large portion of the light from the light source as a P component. The polarized light is emitted in the direction largely deviated from the normal to the front. A prism sheet for redirecting the light to the front toward the liquid crystal cell is used. The polarization can be further improved by placing a further polarization plate on the prism sheet.

Because the reflectance and transmission characteristics are different between the S component and the P component, the light transmitting through the interface and the light reflected by the interface have different polarization components. To explain the principle of operation of this invention, a change of polarization components of the light in transmitting through or reflecting from the interface between materials of different indices of refraction is described with reference to FIGS. 4, 5 and 6.

Figure 4:
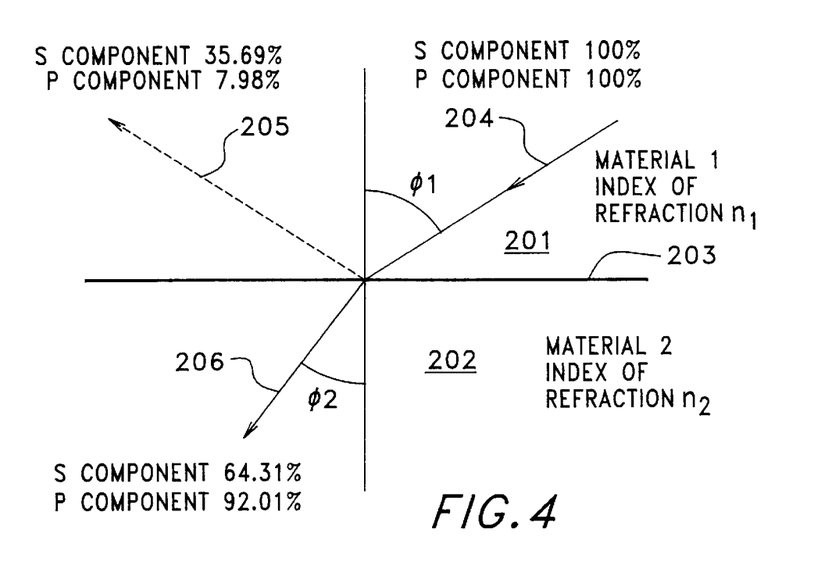
FIG. 4 is a diagram showing refraction of light between different materials.

In FIG. 4, when light 204 reaches an interface 203 between two materials 201 and 202 having different indices of refraction $n_1$ and $n_2$, respectively, a part of the light 205 is reflected when the angle of incidence $\phi_1$ is less than a critical angle while a part of the light 206 transmits through the interface. Assuming that a plane defined by a light incident to a point of incidence on a surface is an incident plane, the incident light 204 is divided into a P component parallel to the incident plane and an S component perpendicular to the incident plane.

Modifying Maxwell equation for a dielectric material, the transmittance of the polarized components P and S are given by;

$$Tp = \sin(2\phi_1) \times \sin(2\phi_2)/(\sin^2(\phi_1+\phi_2) \times \cos^2(\phi_1-\phi_2))$$

$$Ts = \sin(2\phi_1) \times \sin(2\phi_2)/(\sin^2(\phi_1+\phi_2))$$

$$n_1 \times in(\phi_1) = n_2 \times \sin(\phi_2)$$

where

Tp: transmittance of P component (1−reflectance Rp)
Ts: transmittance of S component (1−reflectance Rs)
$\phi_1$: incident angle of light
$\phi_2$: exit angle of light
$n_1$: index of refraction of material 201
$n_2$: index of refraction of material 202 or it is known that;

$$Rp = ((n_1/\cos\phi_1 - n_2/\cos\phi_1 + n_2/\cos\phi_2))^2$$

$$Rs = ((n_1 \times \cos\phi_1 - n_2 \times \cos\phi_2)/(n_1 \times \cos\phi_1 + n_2 \times \cos\phi_2))^2$$

where

Rp reflectance of P component (1−transmittance Tp)
Ts: reflectance of S component (1−transmittance Ts)

Figure 5:
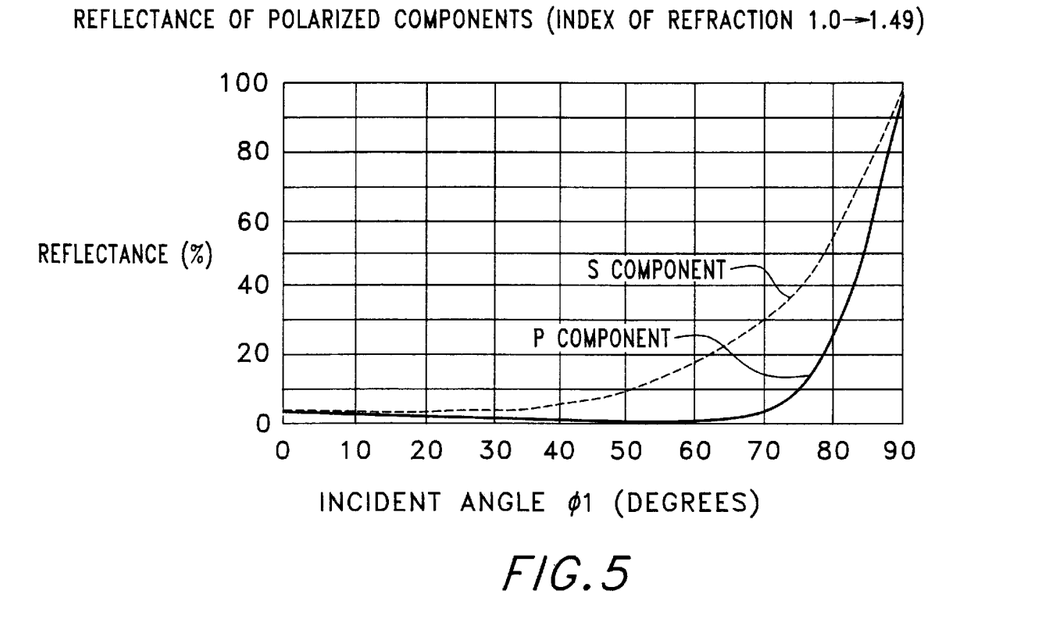
FIG. 5 shows a characteristic plot of reflectance when the light is incident from a material having an index of refraction of 1.0 to a material having an index of refraction of 1.49.
Figure 6:
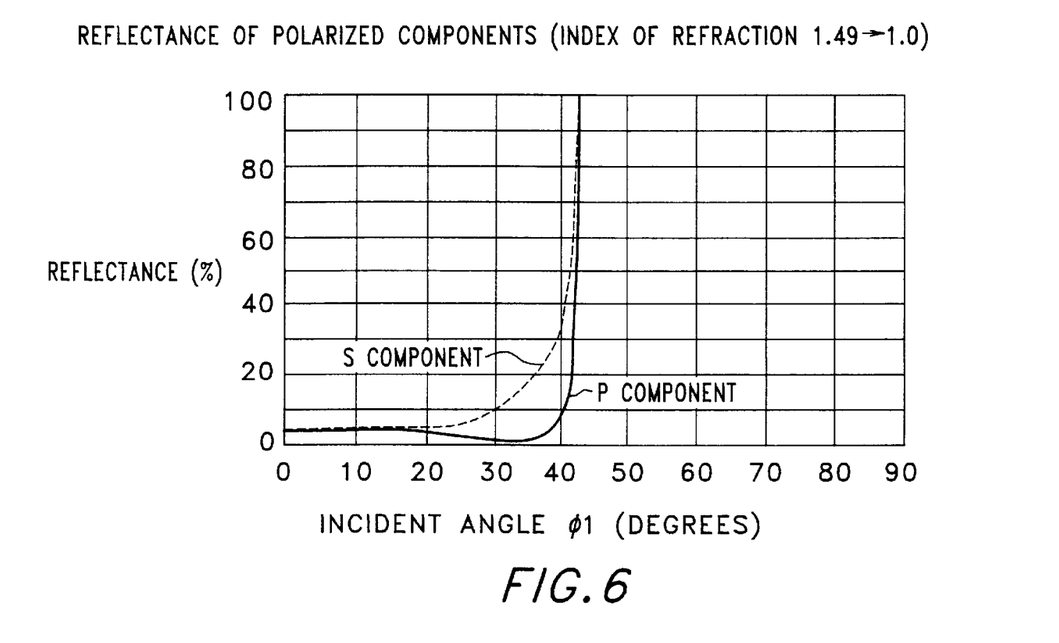
FIG. 6 shows a characteristic plot of reflectance when the light is incident from a material having an index of refraction of 1.49 to a material having an index of refraction of 1.0.

The reflectance of the P polarized component and S polarized component vary depending on the incident angle $\phi_1$ and the exit angle $\phi_2$ as shown in FIG. 5 and FIG. 6, and differ from each other even in a same incident angle $\phi_1$ (reflectance/transmittance characteristics are different between S and P polarized components).

For example, when the light proceeds from an acrylic material having an index of refraction of 1.49 to air which has an index of refraction of 1.00 (FIG. 6), the critical angle in which a total reflection takes place is 42.1-degrees. If the light is incident at 40-degrees which is less than the critical angle, the exit angle $\phi_2$ will be 77.8-degrees according to Snell's law. Substituting the above equation of Rs and Rp with this, the reflectance for the S component is 35.69% while the reflectance for the P component is 7.98%.

It should be clearly understood from the above description referring to FIGS. 4 to 6 how the polarized components of the light are transmitted and reflected in the interface in this invention.

It is understood from the above-described principle that it is important for the layers of the light guide to be laminated in multiple layers to cause the unnecessary S component to be reflected back each time the light reaches the interface between the layers and to be returned as a P component for transmitting through the interface thereby improving the efficiency of converting the light emitting from the unit eventually to a P component.

However, it is disadvantageous to laminate too many layers from the view point of the efficiency of utilizing the energy of the light source because each layer invites some loss of light. In addition, the increased number of laminated layers would result in the increase of the thickness of the entire unit even if a thin layer is used. The increase of the thickness would also invite an increase of the weight. It is the most important objective for a portable information processing device, such as a notebook computer, to decrease the power consumption of its battery as well as the thickness and the weight of the entire unit as much as possible.

SUMMARY OF THE INVENTION

This invention relates to an improvement of a light guide unit of the above-described type, and it is an object of this invention to provide a light guide unit having an unchanged performance with a decreased thickness of the entire unit.

It is another object of this invention to improve the brightness of a liquid crystal display device without resulting in an increase of power consumption by efficiently combining the polarized light from such light guide unit of a high efficiency to a liquid crystal cell.

The basic configuration of this invention lies in a structure in which the light from a light source incident to an end surface of a unit of laminated light guide plates propagates through each layer of the light guide plates and is partly reflected by the other end surface which is obliquely cut. The rest of the light transmitting therethrough causes the polarization plane of the transmitting light to be rotated by a wave length plate lying thereunder and reflected by a reflecting plate lying under the wave length plate for reentrance to the light guide plate again through the wave length plate as a P component.

The P component reentering the light guide plate is incident to an interface between neighboring light guide plates. The incident angle of the light incident to the interface is adapted to be the Brewster angle. Therefore, all P component light incident to the interface and a part of the S component light transmit the interface while the rest of the S component light is reflected back to the wave length plate and the reflecting plate. The light reflected again by the reflecting plate is directed back to the interface after being converted to a P component by the wave length plate, and all P components and a part of S component, if any, transmit through the interface while the rest is reflected.

The light reflected here is subject to the same process repeatedly, and a light converted to a P component in every repetition transmits through the interface. As such, the light guide unit eventually emits a large portion of the light from the light source as a P component. Because the polarized light is emitted in the direction largely deviated from the normal to the front, a prism sheet for redirecting the light to the front toward the liquid crystal cell is used.

In this invention, it is important in the principle of this invention that the S component is reflected in the interface of the light guide layers. The number of the interfaces; i.e., the number of the light guide layers can be reduced by causing as much S component as possible to be reflected to reduce the S component transmitting through the interface.

This invention provides a conversion efficiency comparable to light guide layers using an isotropic material with a lesser number of light guide layers by using a material of an anisotropic index of refraction as the light guide layers to improve the reflectance of the S component in the interface. The axes of two indices of refraction of the anisotropic material coincide with the planes of P and S components, respectively. While the index of refraction in the direction of the axis lying in the plane of the P component may be the same as a conventional one, the index of refraction in the plane of the S component is higher than the conventional one. The higher, the better. It is seen from the expression of the reflectance Rs described above that the reflectance of the S component becomes larger when the index of refraction in the axis of the plane of the S component in the interface is larger.

The light guide unit comprising laminated light guide layers of such anisotropic index of refraction receives an incident light from a light source at the end surface thereof which is a cross-section of the laminated layers to cause a part of the incident light to be reflected at the opposite end surface which is obliquely cut and the rest of the light to be transmitted therethrough. A quarter wave length plate is attached to the obliquely cut end surface and a reflecting plate is provided under the wave length plate.

The light transmitting through the end surface is reflected by the reflecting plate after being rotated by the wave length plate and is incident to the end surface after being rotated by the wave length plate again. The light incident to the end surface is incident to the interface where it is transmitted and reflected as described herein. However, the majority of the S component is reflected in the interface with the rest transmitting through the interface in this invention. Therefore, the light from the light source can be converted to the P component with a lesser number of layers.

In this invention, it is preferred that the light incident to the first interface of the light guide is incident in the Brewster angle. It is readily seen by drawing a geometrical drawing that the angle of incidence of the light to the obliquely cut end surface of the light guide unit decides the angle of incidence at the interface. In this invention, the angle of incidence of the light to the obliquely cut end surface of the light guide unit is so adjusted that the light incident to the first interface of the light guide is incident in the Brewster angle.

The light guide unit is so inclined with respect to the wave length plate and the reflecting plate as to provide an incident angle decided in this manner. In order to reduce the inclination, a plurality of slopes making such incident angle may be formed in the obliquely cut end surface. This allows a necessary incident angle to be provided without inclining the entire light guide unit in this angle. This allows the thickness of the entire unit to be further reduced.

In this invention, the light guide unit may be formed into a shape of a triangular wedge consisting of the top layer of the laminated layers, the obliquely cut end surface and the surface to which the light from the light source is incident. This allows a wedge-shaped space to be provided under the unit for receiving various components. This is advantageous for a portable data processing device in which a thin and light weight type is especially desired.

In another aspect of this invention, the prism means for directing the polarized light to the front has a plurality of prisms disposed in a same pitch as columns of the liquid crystal cells. Each prism has an incident surface and a reflecting surface. Because the light is emitted from the reflecting surface, a portion corresponding to the incident surface is dark. In this invention, the dark incident surface portion is so disposed as not to contribute illuminating the liquid crystal cell by having the portion corresponding to the reflecting surface align the columns of the liquid crystal cell. All the polarized light emitted from the light guide is thus directed to the liquid crystal cell.

DETAILED DESCRIPTION OF THE PREFERRED EMBODIMENTS

Figure 2:
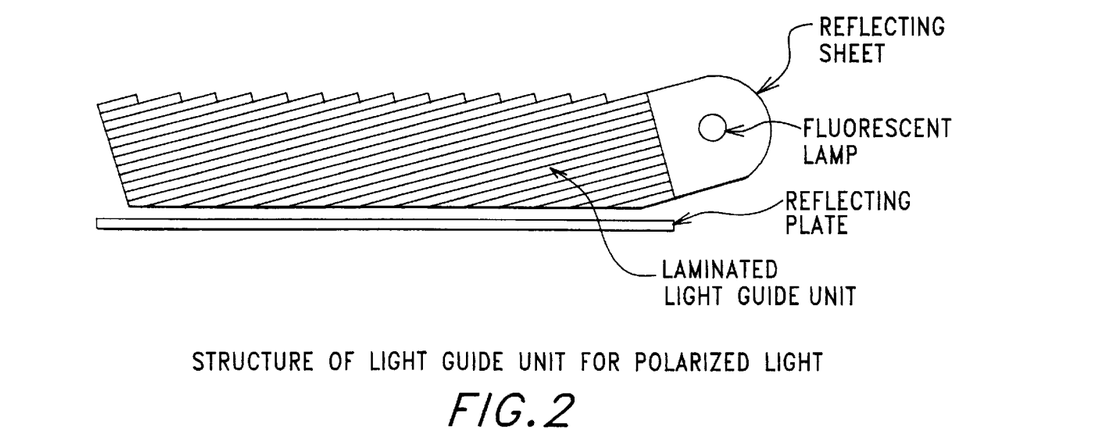
FIG. 2 is a diagram showing the structure of a conventional LCD polarizer plate unit.

The basic structure of this invention is shown in FIG. 2. The laminated light guide unit is made of thin light guide layers laminated as shown and a light source is attached to an end surface thereof The light source comprises a fluorescent lamp and a reflecting sheet. The lamination is cut so as to assume an oblique end surface to which a combination of a quarter wave length plate and a reflecting plate is affixed.

The end surface makes an angle φ with respect to the quarter wave length plate and the reflecting plate. Therefore, the light is incident to the end surface at an angle of $\pi/2-2\phi$. It is readily found from a geometrical drawing that an incident angle to the interface between layers is $\pi/2-2\phi$.

It is preferable that this incident angle is the Brewster angle. When the light is incident to the interface at the Brewster angle, all polarization component lying in the incident plane (P) transmits the interface while all polarization component lying in a plane orthogonal to the incident plane (S) is reflected. Any S component which may transmit through the interface will be reflected by the next interface. The S component reflected from the interface is returned back to the light guide layers by the wave length plate and the reflecting plate as a P component and incident again to the interface. The S component is reflected each time the above process is repeated at a plurality of interfaces transmits through the interface as a P component so that a large portion of the light from the light source is emitted from the light guide unit as a P component.

A plurality of thin light guide films may be further laminated on the top light guide layer of the light guide unit as shown in FIG. 3. This further adds interfaces of transmission and reflection.

The light guide member and the plurality of light guide layers are preferably of a material which assumes a low internal absorption of the light, such as an acrylic sheet and preferably transparent materials including acrylic resin, PMMA (polymethylmethacrylate), polycarbonate, polyethylene, Se, and AgCl. The shape of the light guide member may be in a shape suitable for use such as a bar and a curved surface without being limited to a plate and a sheet.

The light guide member may be of a single piece or a lamination of a plurality of sheets. These light guides are not limited to a same size or a same material and a member requiring stiffness may be designed thick while a member which does not require stiffness may be designed thin. Also, materials of differing indices of refraction may be deposited in multiple layers on a stiff light guide to increase the number of laminated layers while maintaining a stiffness.

In using an acrylic sheet in the light guide member, the thickness of the sheet is preferably 0.1 to 4.0 mm from the consideration of the stiffness and the efficiency of light utilization. The lamination as used in this invention is not limited to insertion of air between the light guides and water vapor may be introduced between the guides for preventing degradation of the light guide unit, water or an adhesive may be inserted between the guides for preventing the guides from being peeled off, or a material having an index of refraction differing from the light guide may be inserted. Higher reflectance of the reflecting plate is preferable in this invention and the reflecting plate may be made of an aluminum deposited sheet, a silver deposited sheet and a metal foil, etc.

In this invention, the light guide layer is made of a material having a high index of refraction in the axis lying in the plane of the S component. For example, while the isotropic index of refraction of an acrylic material is normally 1.49, the index can be increased up to about 1.69 in the direction of the axis lying in the plane of the S component. By doing so, an increased portion of the S component is reflected in the interface (lesser amount of the S component transmit the interface) so that an unchanged effect can be resulted with a lesser number of layers than those required for an isotropic material.

For example, when an acrylic material having an index of refraction 1.49 is used as an isotropic material, the reflectance of the S component is 28% while the transmittance is 72% per layer. With ten layers laminated, the overall transmittance will be $0.72^{10} = 0.04$.

On the other hand, if the index of refraction in the direction of the S component is 1.66, the reflectance is 40% while the transmittance is 60% and the same effect is obtained with 6 layers ($0.6^6 = 0.04$). A sheet having such anisotropic index of refraction is easily available in the market.

While the thickness of the light guide film is not important and it is preferable that the number of the interfaces is as large as possible, the light guiding layer is preferably as thin as possible from the view point of reducing the weight of the light guide unit. An extra space is created by making the thickness of the light guiding layer in this portion extremely thin and the layers of substantially same size may be used in lamination without requiring the layers to be progressively in different sizes resulting in a stepped structure as shown in FIG. 2.

As such, the light is not lost by re-entering from the edge of the layers and dark and bright stripes are eliminated. Even if the steps remain in the layers as shown in FIG. 2, there is little possibility of the light re-entering and recognizable stripes are not generated because the layer is thin and the size of the edge is very small.

By employing the above structure, this invention allows the cross-sectional shape of the light guide unit to be of a triangular shape as shown in FIG. 3, in contrast to the conventional unit which had a rectangular cross-section as shown in FIG. 2. By this structure, the weight and the volume of the unit can be about half the conventional unit. Also, this invention can implement a mode which is similar to the mode in which a conventional back light (not generating a polarized light) uses a light guide of a wedge shaped cross section to provide an effective use of a space and allows a conventional back light to be replaced with the present polarized back light in a form compatible with the conventional type.

While the light guide layer is acrylic material and the surrounding material is air in the example so far described, any material of the layer and any surrounding material may be used so long as the indices of refraction of the materials allow the incident light to satisfy the Brewster angle or an angle which is near the Brewster angle.

The following condition is required for the incident angle $\pi/2 - 2\phi$ to be the Brewster angle $\theta_B$. In the expression, $n_1$ is an index of refraction of the light guide, $n_2$ is an index of refraction of a material other than the light guide (air in FIG. 5), and $\phi$ is the angle of the groove (the slope of the larger angle of inclination). The relationship between Brewster angle $\theta_B$ and $n_1$, $n_2$ is given by;

$$\theta_B = \sin^{-1} [n_1^2/(n_1^2 + n_2^2)]^{1/2} \text{ (rad)}$$

The angle of incidence to the upper surface of the light guide is given by a geometric analysis using $\phi$;

$$\pi/2 - 2\phi \text{ (rad)}$$

Snell's law is expressed on the upper surface of the light guide as;

$$\sin \theta_B / \sin (\pi/2 - 2\phi) = n_1/n_2$$

solving this expression for $\phi$ gives the following general solution;

$$\phi = \cos^{-1} \{(n_2/n_1)[n_1^2 + n_2^2)]^{1/2}\}/2 \text{ (rad)}$$

Any medium satisfies the condition of this invention so long as it satisfies the above general expression.

Figure 3B:
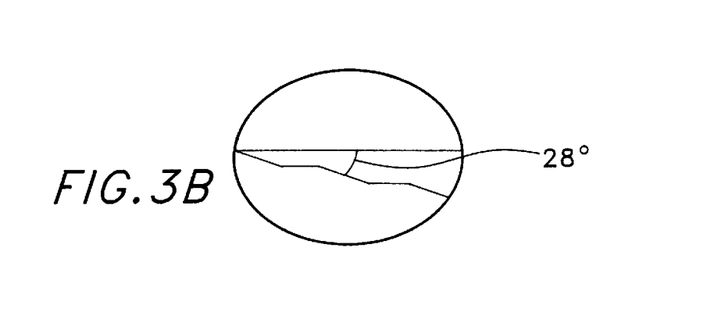
FIG. 3B is an expanded view of a segment of FIG. 3A.

While the entire light guide unit is inclined with respect to the wave length plate and the reflecting plate so as to provide an incident angle which is equal to the Brewster angle, many sloped surfaces which provide such incident angle can be formed in the obliquely cut end surface. As shown in the enlarged view in FIG. 3, many sloped surfaces running perpendicularly to the face of the drawing are formed in the obliquely cut end surface and are so disposed as to provide a desired angle to the incident light in the light guide. An incident angle satisfying the Brewster angle is thus provided though the entire light guide is not inclined in this angle. A necessary incident angle can be thus provided while the light guide unit is not entirely inclined in this angle thereby reducing the thickness of the entire unit.

This invention is contemplated for use as a back light of a liquid crystal display device. The liquid crystal display device comprises a light source and glass substrates sandwiching a liquid crystal to which a polarized light emitted from the light guide unit of this invention is incident.

Figure 8:
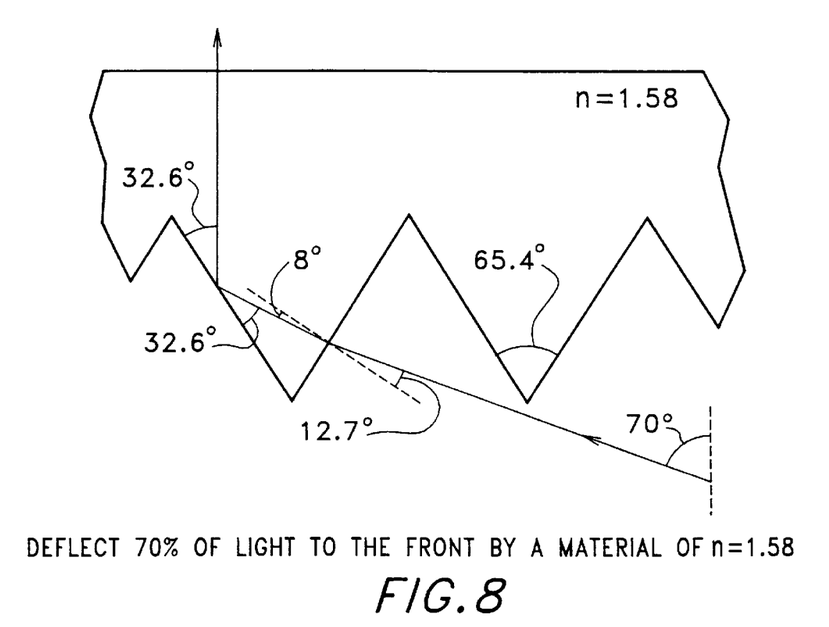
FIG. 8 is a diagram showing deflection of the light by a prism sheet.

The light emitted from the light guide is largely inclined in 70-degrees from the front thereof in this invention. Two methods are available for deflecting the light to the right angle to the front surface. The first method is to have the light refract twice to deflect it to the front, in which a prism sheet is used with the apex thereof oriented upward as shown in FIG. 8. When the index of refraction n of the material of the prism is 1.58, a prism sheet having an angle of apex of 32-degrees is required to deflect the light to the front.

Figure 9:
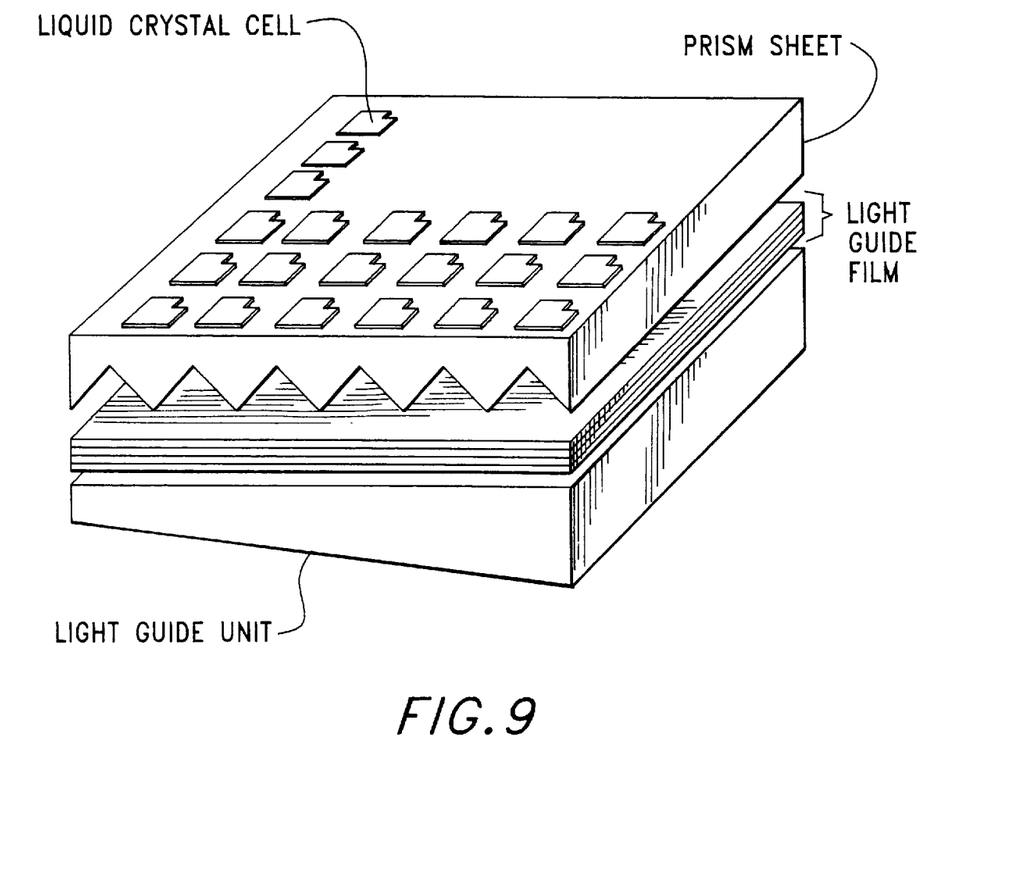
FIG. 9 is a schematic diagram showing a concept of another embodiment of this invention.

A second method is to have the light refract once and totally reflect once to deflect to the front, in which the prism sheet is used with the apex thereof oriented downward as shown in FIG. 9. In this case, a prism having an angle of apex of 65.4-degrees is required. As seen in the above, a same effect is resulted whether the prism is oriented upward or downward. From the view point of fabrication, it is more advantageous in the view point of yield and cost to use the prism with the apex oriented downward because a smaller apex angle of a prism is more difficult to fabricate (a larger apex angle can be used when the apex is oriented downward). The prism sheet is made of a glass or plastic material.

Figure 7:
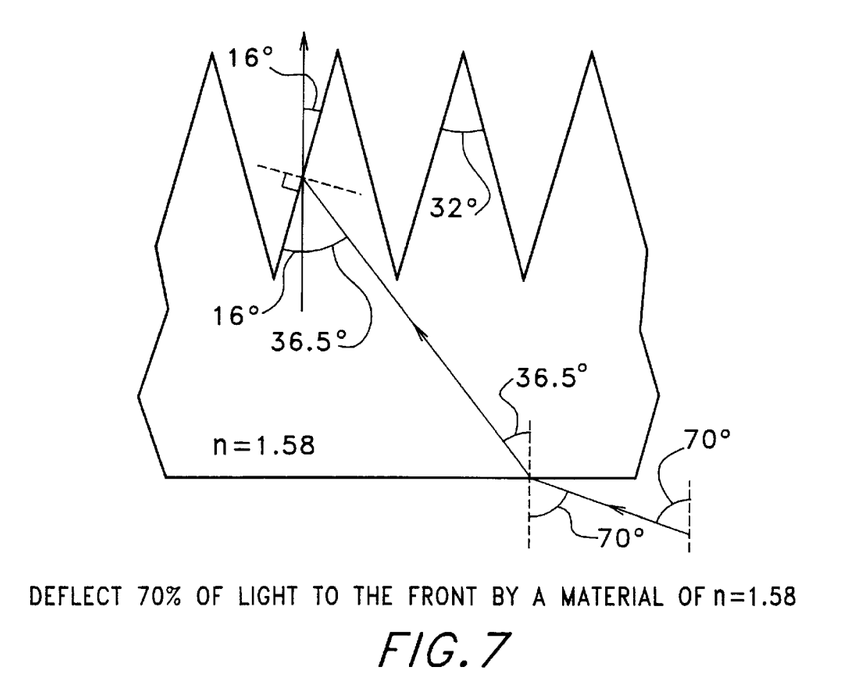
FIG. 7 is a diagram showing deflection of the light by a prism sheet.

In FIGS. 7 and 8, it is seen that the sloped surface of each prism which is not the light reflecting surface does not emit the light to the front. In other words, the light emitted from the prism sheet is in a stripe pattern. This may possibly induce an interference pattern with a gate line or a data line of the liquid crystal cell. In order to prevent the stripe pattern from being generated, the pitch of the prisms of the prism sheet (50 microns, for example) can be made smaller than the pitch of the liquid crystal cell (200 microns, for example)

to mismatch the pitches. By doing so, the prism sheet is observed as if it emits the light uniformly from the front and the interference pattern can be prevented from being generated because the pitch of the prism sheet is very small.

However, the light incident to a portion of the liquid crystal cell array which has no opening is absorbed there and wasted in this case. Another aspect of this invention provides a structure in which such waste is avoided.

According to this structure of this invention, the pitch of the prisms of the prism sheet is made the same as the pitch of the liquid crystal cell array so that the opening part of the liquid crystal cell coincides with a portion of the prism corresponding to the reflecting surface which emits the light. The portion corresponding to the slope of the prism which is not the reflecting surface coincides with the part having no opening.

FIG. 9 is a schematic diagram showing a concept of the inventive structure. As shown in FIG. 9, the pitch of the prisms of the prism sheet is made the same as the pitch of the liquid crystal cell array. The light reflected by the reflecting surface of the prism is directed to the opening part of the liquid crystal cell. The part having no opening does not receive the light because it faces to the surface which is not a reflecting surface. All the light emitted from the light guide unit is thus directed to the opening part, and there is no light which is absorbed without being utilized. It is easy to manufacture the prism because the prism has a larger pitch than those shown in FIGS. 7 and 8. The apex angle and the ratio of reflecting/transmitting surfaces may be suitably decided in a specific design work.

As shown in FIG. 9, the liquid crystal cell array may be formed directly on the prism sheet. In this case, the prism sheet also plays a role of a glass substrate of the liquid crystal cell. The number of interfaces between media is decreased by 2 when compared to a case where an independent prism sheet is disposed between the liquid crystal cell and the light guide film, resulting in a corresponding improvement of efficiency.

The thickness and the weight of the light guide are reduced because the light is converted to the P polarized component with the number of layers less than those of a conventional light guide according to this invention. There is no light which is absorbed without being utilized in another aspect of this invention because all the light from the light guide is directed to the opening part of the liquid crystal cell.

The following is a brief description of the reference numbers as used in the drawings:
100: Conventional LCD device
101: Light source
102: Light guide plate
103: Diffusion sheet
104: Lower polarizer plate
105: Glass substrate
106: Color filter
107: Upper polarizer plate
108: Back light
201: Material 1
202: Material 2
203: Interface between the materials
204: Incident light
205: Reflected light
206: Transmitted light While the exemplary preferred embodiments of the present invention are described herein with particularity, those having normal skill in the art will recognise various changes, modifications, additions and applications other than those specifically mentioned herein without departing from the spirit of this invention.

What is claimed is:

1. A light guide device comprising:
    a light guide unit consisting of a lamination of a plurality of light guide layers in which one end thereof is a light incidence surface and the other end is cut obliquely with respect to the direction of the lamination;
    a reflecting plate disposed adjacent to said other end surface; and
    means disposed between said other end surface and said reflecting plate for changing the polarization direction of light,
    said light guide layers having an anisotropic index of refraction in which the index of refraction in the axis of reflecting one of the polarized components of the light from said incident surface is larger than the index of refraction in the axis of transmitting the other one of said polarized components.

2. A light guide device of claim 1 in which said other end surface is cut obliquely in an angle such that the light reflected by said other end surface and incident to an interface between said light guide layers is incident in the Brewster angle.

3. A light guide device of claim 1 in which said other end surface has a plurality of sloped surfaces in the direction perpendicular to the direction of the lamination of the light guide layers and the direction of incidence of the light.

4. A light guide device of claim 3 in which said sloped surface comprises a combination of a surface having an angle of inclination smaller than the angle of inclination of said other end surface and a surface having a larger angle of inclination which is an angle causing the light reflected from the latter surface and incident to the interface between the light guide layers to be incident in the Brewster angle.

5. A light guide device of claim 4 in which the angle φ of the surface having a larger angle is given by the following expression:

$$\phi = \cos^{-1}\{(n_2/n_1)[n_1^2/(n_1^2+n_2^2)]^{1/2}\}/2 \text{ (rad)}$$

where $n_1$ is an index of refraction of the light guide and $n_2$ is an index of refraction of a material other than the light guide.

6. A light guide device of claim 5 in which a plurality of light guide films are further laminated on the top layer of said plurality of light guide layers of said light guide unit.

7. A light guide device of claim 6 in which said light guide film is thinner than said light guide layer.

8. A light guide device of claim 6 in which a phase film for changing the direction of polarization is further disposed on said plurality of light guide films.

9. A liquid crystal display device comprising a liquid crystal cell and a light guide device disposed in the back of said liquid crystal cell, said light guide device comprising:
    a light guide unit consisting of a lamination of a plurality of light guide layers in which one end thereof is a light incidence surface and the other end is cut obliquely with respect to the direction of the lamination;
    a reflecting plate disposed adjacent to said other end surface;
    means disposed between said other end surface and said reflecting plate for changing the polarization direction of a light; and
    a prism sheet disposed on the top light guide layer of said light guide unit and having an apex part only on one side thereof, the side where said apex is formed facing said light guide unit, said light guide layers having an anisotropic index of refraction in which the index of refraction in the axis of reflecting one of the polarized components of the light from said incident surface is larger than the index of refraction in the axis of transmitting the other one of said polarized components.

* * * * *